UNITED STATES PATENT OFFICE.

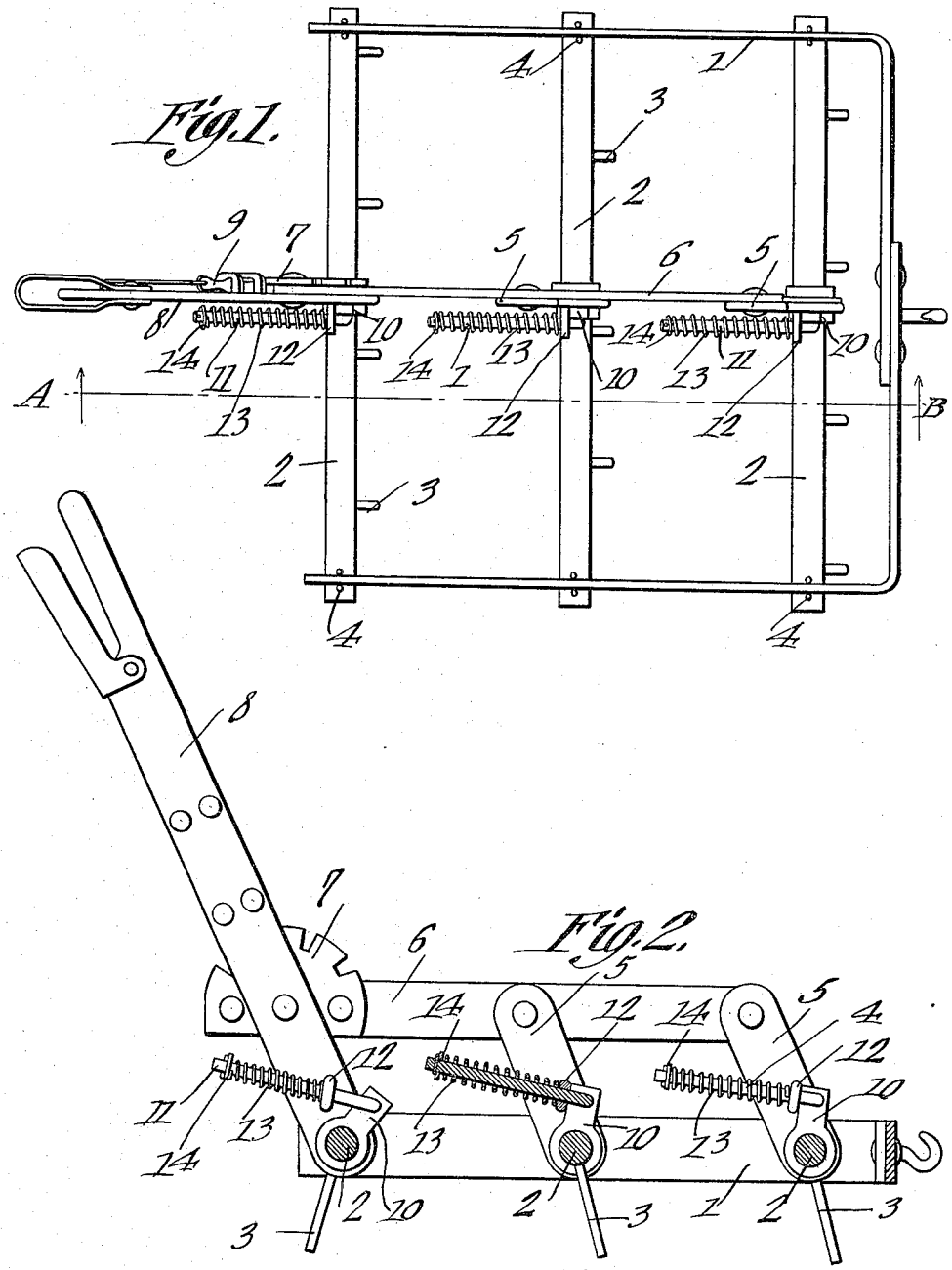

WILLIAM A. BERGMAN, OF HEWITT, MINNESOTA, ASSIGNOR OF ONE-HALF TO ALONZO H. SHARP, OF HEWITT, MINNESOTA.

HARROW.

1,176,334.  Specification of Letters Patent.  Patented Mar. 21, 1916.

Application filed May 26, 1915. Serial No. 30,606.

*To all whom it may concern:*

Be it known that I, WILLIAM A. BERGMAN, a citizen of the United States, residing at Hewitt, in the county of Todd and State of Minnesota, have invented a new and useful Harrow, of which the following is a specification.

This invention relates to improvements in harrows, one of its objects being to provide means whereby all of the tooth bars of the harrow can be adjusted simultaneously but any one of said bars can be shifted independently of the others while the controlling lever is locked, as for example, when one or more of the teeth on the bar comes into engagement with an unyielding obstruction, the independent shifting of the bar and its teeth preventing injury to the teeth such as would occur should the teeth be held fixedly in the positions to which they might be adjusted.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a harrow embodying the present improvements. Fig. 2 is a section on line A—B Fig. 1, one of the tooth bars being shown swung back out of normal position.

Referring to the figures by characters of reference 1 designates the frame of the harrow which can be of any suitable construction and revolubly mounted in the sides of this frame are bars 2 to which the harrow teeth 3 are secured in any manner desired, said bars being held against longitudinal movement by any means preferred as, for example, by means of pins 4 extending through them.

Pivotally mounted on each of the bars 2 is an upwardly extending link 5, these links all being secured to a connecting bar 6. This connecting bar may be provided with a notched segment 7. One of the links 5 is extended upwardly to form a lever 8 and this lever may be provided with a dog 9 for engaging the notched segment 7 to hold the bar 6 against movement relative to the links 5.

Fixedly connected to each bar 2 is an arm 10 extending upwardly therefrom and pivotally secured to each arm 10 is a short rod 11 slidably mounted within an eye 12 extending laterally from the adjacent link 5. A spring 13 is mounted on each rod 11 and bears at one end against the eye 12 and at its other end against a collar 14 on the rod. These springs all serve to hold the arms 10 normally drawn rearwardly against the eyes 12. Thus it will be seen that by manipulating lever 8, the bars 2 can be rotated simultaneously to position the teeth 3 at any desired angles relative to the ground. The harrow can be used as ordinarily but, should any one of the teeth 3 strike an unyielding obstruction, said tooth as well as the bar 2 to which it is secured, will be capable of moving independently of the remaining teeth and bars, the bar rotating in its bearings and pulling, through arm 10, upon rod 11 and thus placing spring 13 under compression, as shown at the left of Fig. 2. After the obstruction has been passed the spring 13 will return the teeth of the bar to their initial positions.

What is claimed is:—

The combination with a harrow frame and parallel transversely extending tooth carrying bars mounted for rotation at their ends within the side of the frame, of an upwardly extending arm fixedly connected to the middle portion of each bar, an upwardly extending lever pivotally mounted upon one of the bars, upwardly extending links parallel with the lever and pivotally mounted upon the other bars, a laterally extending eye upon the lever and upon each of the links, rods pivotally connected to the respective arms and slidably mounted in the adjacent eyes, springs upon the rods and engaging the eyes to hold the arms normally pulled rearwardly against the eyes, and a connecting bar pivotally connected to the links and lever.

In testimony that I claim the foregoing as my own, I have hereto affixed my signature in the presence of two witnesses.

WILLIAM A. BERGMAN.

Witnesses:
L. H. COLSON,
JOSEPHINE HEGSTEAD.

Copies of this patent may be obtained for five cents each, by addressing the "Commissioner of Patents, Washington, D. C."